United States Patent
Kato et al.

(10) Patent No.: US 7,041,397 B2
(45) Date of Patent: May 9, 2006

(54) MAGNETIC RECORDING MEDIUM

(75) Inventors: Kazuo Kato, Kanagawa (JP); Hiroaki Takano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 64 days.

(21) Appl. No.: 10/747,303

(22) Filed: Dec. 30, 2003

(65) Prior Publication Data
US 2004/0151946 A1 Aug. 5, 2004

(30) Foreign Application Priority Data
Jan. 8, 2003 (JP) ............ P.2003-002329

(51) Int. Cl.
*G11B 5/706* (2006.01)
*G11B 5/708* (2006.01)

(52) U.S. Cl. ............ 428/842.3; 428/844

(58) Field of Classification Search ........ 428/141, 428/328, 331, 336, 694 BA, 694 BN, 842.3, 428/844
See application file for complete search history.

(56) References Cited

U.S. PATENT DOCUMENTS 4,963,433 A * 10/1990 Ogawa et al. ........... 428/323

FOREIGN PATENT DOCUMENTS

| JP | 2001-256633 A | 9/2001 |
| JP | 2002-92846 A | 3/2002 |

* cited by examiner

*Primary Examiner*—Stevan A. Resan
(74) *Attorney, Agent, or Firm*—Sughrue Mion, PLLC

(57) ABSTRACT

A magnetic recording medium having on a nonmagnetic support at least one magnetic layer that contains a ferromagnetic metal powder and a binder and has surface roughness of 3 nm or below, with that the ferromagnetic metal powder has an average major-axis length of 30 to 100 nm and saturation magnetization σs of 70 to 100 A·m²/kg and the magnetic layer further contains $SiO_2$ grains having an average size of 5 to 30 nm, which shows excellent electromagnetic conversion characteristics, ensures reduction in MR head abrasion and has enhanced scratch resistance.

14 Claims, No Drawings

MAGNETIC RECORDING MEDIUM

FIELD OF THE INVENTION

The present invention relates to a magnetic recording medium. More specifically, the invention is concerned with a magnetic recording medium which permits high-density recording and reproduction with a high-sensitivity magnetoresistance head.

BACKGROUND OF THE INVENTION

Magnetic recording media hitherto used widely, including videotapes, audio tapes and magnetic disks, are materials which each have a non-magnetic support coated with a magnetic layer containing a particulate ferromagnetic substance, such as particulate ferromagnetic iron oxide, cobalt-modified ferromagnetic iron oxide, $CrO_2$ or ferromagnetic alloy, dispersed in a binder.

Recent years have seen trends for the track width to be narrowed and for the recording wavelength to be shorten with increases in recording density. Under these circumstances, reproduction with a high-sensitivity magnetoresistance head (hereinafter referred to as "an MR head") has been proposed and put into practice.

Recording media used in recording with an MR head are required to have characteristics different from those of recording media hitherto used in recording with an inductive head. In the first place, recording with an MR head requires that recording media reduced in residual magnetization be used. This is because saturation of the MR head occurs when recording media have thick magnetic layers, and their residual magnetization becomes too great. In the second place, the recording media are required to use particulate magnetic substances and have smooth magnetic surfaces for the purpose of reducing medium noises because an MR head has high sensitivity.

In an attempt to address these requirements, head saturation is prevented by reducing the magnetic layer thickness to the range of 0.01 to 0.3 µm and adjusting the residual magnetization to the range of 5 to 50 $A \cdot m^2/kg$, and modulation noises are reduced by defining the intensities of roughness components at specific spatial frequencies (See JP-A-2001-256633).

In another attempt to prevent head saturation and reduce noises at the same time, the magnetic layer is formed with a thickness less than the shortest bit length and the volume filling degree of ferromagnetic powders in a magnetic layer, to which nonmagnetic powders are also added, is adjusted so as to fall within the range of 15 to 35% (See JP-A-2002-92846).

Although the noise reduction has been underway as mentioned above, it has resulted in a discovery that there are problems with head abrasion and durability. An MR head has a configuration that an MR element is imbedded in a low hardness shield layer which is arranged between substrates made of high hardness materials. Therefore, the shield layer containing the MR element is selectively worn away, and a level difference develops between the substrates and the shield layer, thereby increasing a spacing loss. As a result, there occurs a problem that the output is lowered.

In order to minimize those undesirable influences, improvements in electromagnetic conversion characteristics have been attempted by rendering the magnetic layer surface smooth and reducing the spacing loss. However, such a measure yields a detriment that the magnetic layer surface is susceptible to abrasion marks.

SUMMARY OF THE INVENTION

An object of the invention is to provide a magnetic recording medium having suitability for high-density recording, excellent electromagnetic conversion characteristics and improved scratch resistance, and ensuring a reduction in abrasion of an MR head.

As a result of our intensive studies, we have found that the object can be attained by adoption of the following constitution, thereby achieving the invention.

More specifically, the invention is as follows:

(1). A magnetic recording medium containing a nonmagnetic support and a magnetic layer which contains a ferromagnetic metal powder and a binder and has surface roughness of 3 nm or below, wherein the ferromagnetic metal powder has an average major-axis length of 30 to 100 nm and a saturation magnetization of 70 to 100 $A \cdot m^2/kg$, and the magnetic layer contains $SiO_2$ grains having an average size of 5 to 30 nm.

(2). The magnetic recording medium according to item (1), wherein the nonmagnetic support is a flexible material having a thickness of 3.0 to 10 µm (3). The magnetic recording medium according to item (1), wherein the magnetic layer has an average thickness of 40 nm to 150 nm (4). The magnetic recording medium according to item (1), wherein the $SiO_2$ grains have an average size of 5 to 25 nm.

(5). The magnetic recording medium according to item (1), wherein the magnetic layer further contains carbon black and an abrasive.

(6). The magnetic recording medium according to item (1), which further contains an underlayer so that the nonmagnetic support, the underlayer, and the magnetic layer is in this order.

(7). The magnetic recording medium according to item (6), wherein the underlayer contains a nonmagnetic inorganic powder and a binder.

(8). The magnetic recording medium according to item (1), which further contains a backing coat layer so that the backing coat layer, the nonmagnetic support, and the magnetic layer is in this order.

(9). The magnetic recording medium according to item (8), wherein the backing coat layer contains a binder, carbon black and an inorganic powder.

(10). The magnetic recording medium according to item (1), wherein the ferromagnetic powder has specific surface area of 40 to 80 $m^2/g$ (11). The magnetic recording medium according to item (1), wherein the ferromagnetic powder has a crystallite size of 80 to 180 Å.

(12). The magnetic recording medium according to item (1), wherein the ferromagnetic powder has aspect ratio of 5 to 15.

(13). The magnetic recording medium according to item (1), wherein the ferromagnetic powder has a coercive force of 151 to 279 kA/m (14). The magnetic recording medium according to item (1), which is for use in a digital recording system equipped with an MR reproducing head.

(15). A method containing reproducing a magnetic recording medium by MR head, wherein the magnetic recording medium contains a nonmagnetic support and a magnetic layer which contains a ferromagnetic metal powder and a binder and has surface roughness of 3 nm or below, wherein the ferromagnetic metal powder has an average major-axis length of 30 to 100 nm and a saturation magnetization of 70 to 100 A·m²/kg, and the magnetic layer contains SiO₂ grains having an average size of 5 to 30 nm.

In MR head-equipped recording systems in particular, the magnetic recording medium according to the invention shows excellent electromagnetic conversion characteristics, ensures reduction in MR head abrasion and has enhanced resistance to scratches. So the invention can deliver a durable magnetic recording medium for high-density recording use.

DETAILED DESCRIPTION OF THE INVENTION

The present recording medium is described below in detail.

In the first place, a magnetic layer as a characteristic constituent of the present magnetic recording medium is illustrated.

[Magnetic Layer]

The magnetic layer of the present magnetic recording medium is a layer containing a ferromagnetic metal powder and a binder.

It is appropriate that the magnetic layer of the present magnetic recording medium have its average thickness in the range of 40 nm to 150 nm, preferably 50 nm to 120 nm. When the magnetic layer thickness is below 40 nm, the output is lowered and sufficient C/N cannot be attained. When the magnetic layer is thicker than 150 nm, on the other hand, the noise component is increased, and besides, the density of magnetic flux from the magnetic layer to an MR head becomes so high that a saturation phenomenon is caused in the MR head and outputs at high frequencies in particular are reduced to result in C/N degradation.

The surface (upper layer) of the present magnetic recording medium has a center-plane average surface roughness (Ra) of 3.0 nm or below, preferably 0.5 to 3.0 nm, far preferably 2.7 nm or below, particularly preferably 2.5 nm or below. When the value Ra is increased beyond 3.0 nm, losses due to spacing between the magnetic recording medium and the head become so great that outputs are lowered and a loud noise is made in some cases, and so there are cases where the present recording medium cannot achieve its recording medium capability. When the value Ra is smaller than 0.5 nm, on the other hand, there may be undesirable cases where the upper layer becomes susceptible to damage from the magnetic head. The term Ra used herein refers to the value determined according to the MIRAU method and using WYKO HD-2000 under conditions that the measuring wavelength is 770 nm, the measuring area is about 250 μm×about 180 μm and both tilt and cylinder corrections are made.

[Ferromagnetic Metal Powder]

Ferromagnetic metal powders (simply referred to as ferromagnetic powders as well, hereinafter) suitable for use in the present magnetic layer are those predominantly composed of α-Fe. In addition to the specified atoms, these ferromagnetic powders may contain atoms of other species, such as atoms of Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr or B. In particular, it is appropriate that the ferromagnetic powders contain atoms of at least one species selected from Al, Si, Ca, Y, Ba, La, Nd, Co, Ni or B, preferably selected from Co, Y or Al, in addition to atoms of α-Fe. The suitable content of Co is from 0 to 40 atomic %, preferably from 15 to 35 atomic %, far preferably from 20 to 35 atomic %, based on Fe. The suitable content of Y is from 1.5 to 15 atomic %, preferably from 3 to 12 atomic %, based on Fe. The suitable content of Al is from 1.5 to 15 atomic %, preferably from 3 to 12 atomic %, based on Fe. In advance of dispersion, these ferromagnetic powders may be treated with a dispersing agent, a lubricant, a surfactant and/or an antistatic agent as described hereinafter. Detailed descriptions thereof can be found in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, and U.S. Pat. Nos. 3,026,215, 3,031,341, 3,100,194, 3,242,005 and 3,389,014.

The ferromagnetic metal powder as mentioned above may contain a small amount of hydroxides or oxides. In producing ferromagnetic metal powders used in the invention, known methods can be adopted. Examples of a known production method which can be adopted in the invention include a method of reducing a compound organic acid salt (mainly oxalates) with a reducing gas, such as hydrogen; a method of producing particulate Fe or Fe—Co via reduction of iron oxide with a reducing gas, such as hydrogen; a method of thermally decomposing a metal carbonyl compound; a method of adding a reducing agent, such as sodium borohydride, a hydrophosphite or hydrazine, to a water solution of ferromagnetic metal ions; and a method of evaporating a metal in an inert gas atmosphere of low pressure, thereby pulverizing the metal.

The ferromagnetic metal powders produced by the methods as recited above may be subjected to any of slow oxidation treatments, including a method of drying the powders after immersion in an organic solvent, a method of immersing the powders in an organic solvent and thereinto blowing an oxygen-containing gas to form an oxide layer on the particle surface and further drying the particles, and a method of forming an oxide layer on the particle surface by controlling pressure shares of oxygen gas and inert gas without using any organic solvent.

When the specific surface area is expressed in terms of the value determined according to BET method, the ferromagnetic powder contained in the present magnetic layer has its value in the range of 40 to 80 m²/g, preferably in the range of 45 to 70 m²/g. It is undesirable that the ferromagnetic powder has its specific surface area outside the foregoing range, because values smaller than 40 m²/g cause a noise increase and those greater than 80 m²/g make it difficult to attain satisfactory surface properties. The crystallite size of the ferromagnetic metal powder is from 80 to 180 Å, preferably from 90 to 170 Å, particularly preferably from 100 to 160 Å.

The average major-axis length (long-axis length) of the ferromagnetic metal powder is from 30-to 100 nm, preferably from 40 to 90 nm. The aspect ratio (acicular ratio) (average ratio of major-axis length to minor-axis length) of the ferromagnetic metal powder is preferably from 5 to 15, far preferably from 6 to 12.

When the ferromagnetic powder has an average major-axis length shorter than 30 nm, the thermal stability thereof becomes low, and magnetic properties of high stability is sometimes difficult to obtain; while, when the average major-axis length is longer than 100 nm, noises increase and C/N is lowered.

The aspect ratio is represented by the ratio of the average major-axis length measured with a transmission electron microscope to the crystallite size determined by X-ray diffractometry.

The saturation magnetization σs of the ferromagnetic metal powder is from 70 to 100 A·m²/kg (emu/g), preferably from 75 to 100 A·m²/kg (emu/g).

When the saturation magnetization as is below 70 A·m²/kg, a drop in output is caused occasionally; while, when it is increased beyond 100 A·m²/kg, sometimes noises become loud.

The suitable coercive force of ferromagnetic power is from 151 to 279 kA/m (1,900 to 3,500 Oe), preferably from 159 to 263 kA/m (2,000 to 3,300 Oe), far preferably from 159 to 239 kA/m (2,000 to 3,000 Oe).

It is appropriate that the ferromagnetic metal powder have its water content in the range of 0.01 to 2%. The water content in the ferromagnetic powder is preferably optimized depending on the kind of binder used in combination. Further, it is advantageous that the pH of the ferromagnetic powder be optimized depending on the combination with the binder used. The optimal pH range is from 4 to 12, preferably from 6 to 10.

The ferromagnetic powder may receive surface treatment and thereby be coated with Al, Si, P or an oxide of such an element, if desired. The proportion of such an element or its oxide to the ferromagnetic powder is from 0.1 to 10%. This surface treatment can produce a desirable effect that the adsorption of a lubricant, such as fatty acids, can be controlled to 100 mg/m² or below. Cases are met with that ferromagnetic powders used contain inorganic soluble ions, such as Na, Ca, Fe, Ni and Sr ions. Although it is preferable that such ions are substantially absent in the ferromagnetic powders, they have little effect on magnetic characteristics so far as their content is 200 ppm or below. Further, it is advantageous to use a ferromagnetic powder having fewer pores. The suitable percentage of pores is 20 volume % or below, preferably 5 volume % or below. In addition, the ferromagnetic metal powder used in the invention may have any of acicular, rice-grain and spindle shapes as far as it meets the foregoing particle size requirements. When the ferromagnetic powder itself has smaller SFD (switching field distribution), it can yield the better results. The appropriate value of SFD is 0.6 or below. And the ferromagnetic powder is required to have narrow distribution of coercive force Hc. The SFD values below 0.6 are suitable for high-density digital magnetic recording, because they can ensure satisfactory electromagnetic conversion characteristics, high output, sharp magnetization flip and reduced peak shift. In the case of ferromagnetic metal powders, the narrow distribution of Hc can be attained by making a size distribution of geothite narrow or selecting a condition to retard sintering of geothite.

The magnetic layer of the present magnetic recording medium further contains SiO₂ grains having an average size of 5 to 30 nm.

These SiO₂ grains are distributed over the magnetic layer surface and enable a reduction of MR head abrasion by lowering frequency of contact between the MR head and abrasive grains (including grains of abrasives and magnetic substances) present at the magnetic layer surface. In addition, the SiO₂ grains are distributed inside the magnetic layer and reinforce the magnetic layer, thereby producing an improvement in scratch resistance. The suitable sizes of these SiO₂ grains are in the range of 5 to 25 nm.

When the SiO₂ grains have an average size smaller than 5 nm, sometimes they are difficult to secure steady dispersibility; while, when their average grain size is increased beyond 30 nm, deterioration in surface quality of the magnetic layer occurs in some cases.

Examples of SiO₂ grains usable herein include Nano Tek SiO₂ produced by C.I. KASEI CO., LTD., Snowtex colloidal silica MEK-ST produced by Nissan Chemical Industries, Ltd., Aerosil 380 (7 nm), Aerosil 200CF (12 nm), Aerosil 974 (12 nm) and Aerosil 50 (30 nm) produced by Nippon Aerosil Co., Ltd.

The magnetic layer of the present magnetic recording medium may further contain carbon black.

Examples of carbon black usable in the present magnetic layer include furnace black for rubber use, thermal black for rubber use, carbon black for color and acetylene black. It is preferable that the carbon black used herein has its specific surface area in the range of 5 to 500 m²/g, its DBP absorptive capacity in the range of 10 to 400 ml/100 g, its average particle size in the range of 5 to 300 nm, its pH in the range of 2 to 10, its water content in the range of 0.1 to 10 weight % and its tap density in the range of 0.1 to 1 g/ml. Examples of carbon black having the foregoing physical properties include BLACKPEARLS 2000, 1300, 1000, 900, 800, and 700, and VULCAN XC-72, produced by Cabot Corporation; #80, #60, #55, #50 and #35 produced by Asahi Carbon Co., Ltd.; #2400B, #2300, #900, #100, #30, #40 and #10B produced by Mitsubishi Chemical Industries Ltd.; and CONDUCTEX SC, and RAVEN 150, 50, 40 and 15, produced by Columbian Carbon Co. In advance of its use, carbon black may be surface-treated with a dispersing agent, a resin may be grafted onto carbon black, or carbon black surface may be partly converted into graphite. On the other hand, carbon black may be dispersed into a binder before it is added to a coating composition for forming the magnetic layer. The carbon black of various types as recited above may be used alone or as combinations.

The suitable amount of carbon black added is from 0.1 to 30% by weight of the amount of ferromagnetic powder used.

The carbon black has functions of preventing the magnetic layer from being electrified, reducing a friction coefficient of the magnetic layer, shielding the magnetic layer from light and heightening film strength of the magnetic layer. These functions vary depending on the type of carbon black used. Therefore, needless to say, the types, the amounts and the combinations of carbon black products can be chosen on the basis of various properties as mentioned above, including particle size, oil absorption, electric conductivity and pH, so as to suit the magnetic layer and the underlayer, respectively, depending on the intended purposes. Details of carbon black usable in the present magnetic layer can refer to, e.g., *Carbon Black Binran* (*which may be translated by the English title "Handbook of Carbon Black"*), compiled by Carbon Black Association.

It is preferable that the magnetic layer of the present magnetic recording medium contains an abrasive.

The abrasive usable in the magnetic layer is made up mainly of one or more of known materials having Mohs' hardness of at least 6, such as aluminum oxide having an α-alumina content of at least 90%, β-alumina, silicon carbide, chromium oxide, cerium oxide, α-iron oxide, corundum, silicon nitride, silicon carbide, titanium carbide, titanium dioxide, silicon dioxide and boron nitride. Further, these abrasives may be used in the form of complex (obtained by treating the surface of one abrasive with another abrasive). Although those abrasives sometimes contain compounds or elements other than their major components, the minor components have no effect on abrasive function as far as their respective major components are present in proportions of not lower than 90 weight %. The suitable average particle size of those abrasives is from 0.05 to 0.3 μm, preferably from 0.05 to 0.25 μm. In order to enhance electromagnetic conversion characteristics in particular, it is advantageous that those abrasives have narrow particle size distributions. For elevation of durability, on the other hand, abrasives having different particle sizes are combined as required, or abrasives may be used individually as far as their particle size distributions are broad. It is appropriate that the abrasives used in the invention have their tap density in the range of 0.3 to 1.5 g/cc, their water content in the range of 0.1 to 5 weight %, their pH in the range of 2 to 11 and their specific surface area $S_{BET}$ in the range of 1 to 40 m$^2$/g.

The abrasives used in the present magnetic layer may have any of acicular, spherical and cubic shapes. However, shapes having edges in parts are advantageous from the viewpoint of abrasive capability. Examples of commercially available abrasives include AKP-10, AKP-15, AKP-20, AKP-30, AKP-50, HIT-20, HIT-30, HIT-50, HIT-60A, HIT-70, HIT-80, HIT-82 and HIT-100, which are products of Sumitomo Chemical Co., Ltd.; ERC-DBM, HP-DBM and HPS-DBM, which are products of Reynolds Co.; WA10000, a product of Fujimi Corporation; UB20, a product of Uemura Kogyo & Co., Ltd.; G-5, Kuromex U2 and Kuromex U1, products of Nippon Chemical Industrial Co., Ltd.; TF100 and TF140, products of Toda Kogyo Corp.; Beta Random Ultrafine, a product of Ibiden Co. Ltd.; and B-3, a product of Showa Mining Co., Ltd. Needless to say, optimum values are selected for the sizes and the amounts of abrasive particles added to the magnetic layer (upper layer). These abrasives may undergo dispersion treatment with a binder in advance, and then be added to a magnetic coating composition.

[Nonmagnetic Layer (Underlayer)]

In the present magnetic recording medium, it is preferable to arrange a non-magnetic layer (underlayer) between a non-magnetic support and the magnetic layer. By arranging such an underlayer, the magnetic layer can be simply referred to as the upper layer.

Details of the underlayer are illustrated below.

The underlayer contains a nonmagnetic inorganic powder (hereinafter simply referred to as a nonmagnetic powder, too) and a binder.

The nonmagnetic powder used in the underlayer can be selected from inorganic compounds, such as metal oxides, metal carbonates, metal sulfates, metal nitrides, metal carbides or metal sulfides. Examples of an inorganic compound usable as the nonmagnetic powder include aluminum oxide having an α-alumina content of at least 90%, β-alumina, γ-alumina, θ-alumina, silicon carbide, chromium oxide, cerium oxide, α-iron oxide, hematite, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate, molybdenum disulfide and combinations of two or more thereof. Of these inorganic compounds, titanium dioxide, zinc oxide, iron oxide and barium sulfate are used to advantage over others because these compounds have narrow particle size distributions and many means to impart functions. In particular, it is effective to use titanium oxide or α-iron oxide.

It is appropriate that the particle sizes of those nonmagnetic powders be in a range of 0.005 to 0.5 μm. However, if needed, the same effect can be produced by combined use of nonmagnetic powders having different particle sizes or independent use of a nonmagnetic powder having a board size distribution. In particular, nonmagnetic powders having their particle sizes in the range of 0.01 to 0.2 μm are preferred over the others. When the nonmagnetic powder is particulate metal oxide, the suitable average diameter thereof is 0.08 μm or below; while, in the case of acicular metal oxide, the suitable average major-axis length is 0.2 μm or below, preferably 0.15 μm or below, far preferably 0.1 μm or below. The suitable aspect ratio of the nonmagnetic powder is from 2 to 20, preferably from 3 to 10. The tap density is from 0.05 to 2 g/ml, preferably from 0.2 to 1.5 g/ml.

The nonmagnetic powders have their water contents in a range of 0.1 to 5 weight %, preferably 0.2 to 3 weight %, particularly preferably 0.3 to 1.5 weight %. The pH of the nonmagnetic powders is in a range of 2 to 11, but the pH range of 5.5 to 10 is preferred in particular. These nonmagnetic powders are highly adsorptive to functional groups, and so they can be dispersed well and impart high mechanical strength to coatings.

The specific surface areas of the nonmagnetic powders are in a range of 1 to 100 m$^2$/g, preferably 5 to 80 m$^2$/g, far preferably from 10 to 70 m$^2$/g.

The suitable crystallite sizes of nonmagnetic powders are in a range of 0.004 to 1 μm, preferably 0.04 to 0.1 μm.

The oil absorptive capacity using dibutyl phthalate (DBP) is in a range of 5 to 100 ml/100 g, preferably 10 to 80 ml/100 g, far preferably 20 to 60 ml/100 g. The specific gravity is generally from 1 to 12, preferably from 3 to 6.

The nonmagnetic powders may have any of acicular, spherical, polyhedral and tabular shapes. The suitable Mohs' hardness of nonmagnetic powders is from 4 to 10. The amounts of stearic acid (SA) adsorbed to nonmagnetic powders are in the range of 1 to 20 μmol/m$^2$, preferably 2 to 15 μmol/m$^2$, far preferably 3 to 8 μmol/m$^2$. The suitable pH of SA-adsorbed powders is between 3 and 6. It is appropriate that $Al_2O_3$, $SiO_2$, $TiO_2$, $ZrO_2$, $SnO_2$, $Sb_2O_3$, $ZnO$ or $Y_2O_3$ be present on the surfaces of nonmagnetic powders by subjecting the powders to surface treatment. Of these oxides, $Al_2O_3$, $SiO_2$, $TiO_2$ and $ZrO_2$, especially $Al_2O_3$, $SiO_2$ and $ZrO_2$, are preferred over the others from the viewpoint of dispersibility in particular. Those oxides maybe used in combination or independently. Depending on the intended purposes, such a surface treatment layer can be formed by co-precipitation of oxides, or by providing an alumina layer first and then silica layer, or vise versa. In addition, the surface treatment layer formed may be porous depending on the intended purposes, but it is generally appropriate that the layer be uniform and dense.

Examples of a nonmagnetic powder usable in the present underlayer include Nanotite produced by Showa Denko K.K.; HIT-100 and ZA-G1 produced by Sumitomo Chemical Co., Ltd.; α-hematite DPN-250, DPN-250BX, DPN-245, DPN-270BX, DPN-500BX, DBN-SA1 and DBN-SA3, produced by Toda Kogyo Corp.; titanium dioxide TTO-51B, TTO-55A, TTO-55B, TTO-55C, TTO-55S, TTO-55D and SN-100, and α-hematite E270, E271, E300 and E303, produced by Ishihara Sangyo; titanium dioxide STT-4D, STT-30D, STT-30 and STT-65C, and α-hematite α-40, produced by Titan Kogyo; MT-100S, MT-100T, MT-150W, MT-500B, MT-600B, MT-100F and MT-500HD, produced by TYCA Corporation; FINEX-25, BF-1, BF-10, BF-20 and ST-M, produced by Sakai Chemical Industry Co., Ltd.; DEFIC-Y and DEFIC-R, produced by Dowa Mining Co., Ltd.; AS2BM and $TiO_2P25$, produced by Nippon Aerosil; 100A and 500A, produced by Ube Industries Ltd.; and burned substances thereof. Of these products, titanium dioxide and α-iron oxide products are preferred in particular.

By mixing carbon black in the underlayer, known effects can be imparted to the underlayer. For instance, the surface electric resistance Rs can be lowered, the light transmittance can be reduced, and the desired micro Vickers hardness can be attained. As to the types of carbon black capable of producing such effects, furnace black for rubber use, thermal black for rubber use, carbon black for color and acetylene black are usable.

The carbon black used in the underlayer has its specific surface area in the range of 100 to 500 $m^2/g$, preferably 150 to 400 $m^2/g$, and its DBP absorptive capacity in the range of 20 to 400 ml/100 g, preferably 30 to 400 ml/100 g. The average particle size of the carbon black used is from 5 to 80 nm, preferably from 10 to 50 nm, far preferably from 10 to 40 nm. Further, it is appropriate that the pH, the water content and the tap density of carbon black used be from 2 to 10, from 0.1 to 10% and from 0.1 to 1 g/ml, respectively. Examples of carbon black usable in the present underlayer include BLACKPEARLS 2000, 1300, 1000, 900, 800, 880 and 700, and VULCAN XC-72, produced by Cabot Corporation; #3050B, #3150B, #3250B, #3750B, #3950B, #950, #650B, #970B, #850B, MA-600, MA-230, #4000 and #4010, produced by Mitsubishi Chemical Industries Ltd.; CONDUCTEX SC, and RAVEN 8800, 8000, 7000, 5750, 5250, 3500, 2100, 2000, 1800, 1500, 1255 and 1250, produced by Columbian Carbon Co.; and KETJENBLACK EC produced by Akuzo Co. In advance of its use, carbon black may be surface-treated with a dispersing agent, a resin may be grafted onto carbon black, or carbon black surface may be partly converted into graphite. On the other hand, carbon black may be dispersed into a binder before it is added to a coating composition. The thus pre-treated carbon black can be used in a proportion lower than 50 weight % to the non-magnetic inorganic powders, and that in a proportion lower than 40 weight % to the total weight of the nonmagnetic layer. The carbon black of various types as recited above may be used alone or as combinations. Details of various types of carbon black usable in the invention can refer to, e.g., *Carbon Black Binran* (which may be translated by the English title "*Handbook of Carbon Black*"), compiled by Carbon Black Association.

To the underlayer, organic powders can also be added depending on the intended purposes. Examples of an organic powder which can be added include acrylic-styrene resin powder, benzoguanamine resin powder, melamine resin powder and phthalocyanine pigments. Further, polyolefin resin powder, polyester resin powder, polyamide resin powder, polyimide resin powder and polyfluoroethylene resin powder may be used. For production of those organic powders, the methods described in JP-A-62-18564 and JP-A-60-255827 can be adopted.

In the present underlayer, it is preferable to contain abrasives as used in the magnetic layer. Addition of abrasives to the underlayer enables controls of a surface profile and a protruding state of abrasives. It goes without saying that the particle sizes and the amounts of abrasives added to the underlayer should be optimized.

[Backing Coat Layer]

In general, magnetic tapes for recording computer data are strongly required to withstand repeated running, compared with videotapes and audio tapes. For retention of a great durability under running conditions, it is appropriate that on the side opposite to the magnetic layer the nonmagnetic support be provided with a backing coat layer containing a binder, carbon black and an inorganic powder.

As the carbon black used in the backing coat layer, a combination of two types of carbon black products differing in average particle size is preferred. In this case, it is appropriate that fine-particle carbon black ranging in average particle size from 10 to 20 nm and coarse-particle carbon black ranging in average particle size from 230 to 300 nm be used in combination. In general, addition of fine-particle carbon black enables the backing coat layer to have both low surface electrical resistance and low light transmittance. Depending on the types, many of magnetic recorders utilize light transmittance of tapes for operation signals. In these cases, therefore, the addition of fine-particle carbon black is especially effective. Moreover, fine-particle carbon black is generally high in liquid lubricant-holding power, so it can contribute to reduction in friction coefficient when used in combination with a liquid lubricant. The coarse-particle carbon black ranging in size from 230 to 300 nm, on the other hand, has a function as solid lubricant and forms minute projections on the backing layer surface to result in contact area reduction, thereby contributing to reduced friction coefficient. However, coarse-particle carbon black has a drawback of being liable to come off the backing coat layer by tape slide in a rigorous running system and lead to an increase in error rate.

Examples of commercially available fine-particle carbon black include RAVEN2000B (18 nm) and RAVEN1500B (17 nm) (products of Columbian Carbon Co.), BP800 (17 nm) (a product of Cabot Corporation), PRINTEX90 (14 nm), PRINTEX95 (15 nm), PRINTEX85 (16 nm) and PRINTEX75 (17 nm) (products of Degussa AG) and #3950 (16 nm) (a product of Mitsubishi Chemical Industries Ltd.).

Examples of commercially available coarse-particle carbon black include thermal black (270 nm) (a product of Cancarb Limited) and RAVEN MTP (275 nm) (a product of Columbian Carbon Co.).

In the case of containing two types of carbon black having different average particle sizes in the backing coat layer, the suitable ratio (by weight) of fine-particle carbon black measuring 10–20 nm in average size to coarse-particle carbon black measuring 230–300 nm in average size is from 98:2 to 75:25, preferably from 95:5 to 85:15.

In the backing coat layer, the carbon black (the total carbon black in the case of using two types of carbon black) is contained in a proportion of generally 30 to 80 parts by weight, preferably 45 to 65 parts by weight, for every 100 parts by weight of binder.

In the backing coat layer, it is preferable that two kinds of inorganic powders differing in hardness are used in combination.

Specifically, it is appropriate to use a soft inorganic powder having Mohs' hardness of 3 to 4.5 and a hard inorganic powder having Mohs' hardness of 5 to 9.

Addition of a soft inorganic powder having Mohs' hardness of 3 to 4.5 can stabilize the coefficient of repeated running friction. Moreover, the inorganic powder cannot scrape sliding guide poles as far as the hardness thereof is within such a range. And the suitable average grain size of the soft inorganic powder is from 30 to 50 nm.

Examples of an inorganic powder having Mohs' hardness of 3 to 4.5 include calcium sulfate, calcium carbonate, calcium silicate, barium sulfate, magnesium carbonate, zinc carbonate and zinc oxide. These powders can be used alone, or as combinations of two or more thereof. Of these powders, calcium carbonate is preferred in particular.

The suitable content of soft inorganic powder in the backing coat layer is from 10 to 140 parts by weight, preferably from 35 to 100 parts by weight, per 100 parts by weight of carbon black.

The addition of hard inorganic powders having Mohs' hardness of 5 to 9 can heighten the strength of the backing coat layer and enhance running durability. The use of these inorganic powders in combination with carbon black and the soft inorganic powders as recited above can reduce deterioration from repeated sliding and strengthen the backing coat layer. Further, the hard inorganic powders added can impart an appropriate grinding power to the backing coat layer to result in reduced adhesion of scrapings to tape guide poles. In addition, the use of hard inorganic powders in combination with soft inorganic powders (notably calcium carbonate) in particular enhances characteristics relating to sliding over guide poles having rough surfaces and can stabilize the friction coefficient of the backing coat layer.

It is appropriate that the hard inorganic powders have their average grain sizes in the range of 80 to 250 nm (preferably 100 to 210 nm).

Examples of a hard inorganic powder having Mohs' hardness of 5 to 9 include α-iron oxide, α-alumina, and chromium oxide ($Cr_2O_3$). These powders may be used alone or as a combination of two or more thereof. Of these uses, independent use of α-iron oxide or α-alumina is preferred over the others. The content of hard inorganic powders is generally from 3 to 30 parts by weight, preferably from 3 to 20 parts by weight, per 100 parts by weight of carbon black.

In the case of using a combination of soft and hard inorganic powders in the backing coat layer, it is preferable to select these powders so that the hardness difference between the powders is at least 2 (preferably at least 2.5, particularly preferably at least 3).

It is advantageous for the backing coat layer to contain two kinds of inorganic powders having specified average grain sizes and different Mohs' hardness and two types of carbon black differing in average particle size. In this combination, it is especially preferable to use calcium carbonate as the soft inorganic powder.

The backing coat layer can further contain a lubricant. The lubricant can be selected appropriately from those recited as examples of lubricants usable in the nonmagnetic layer or the magnetic layer. To the backing coat layer, such lubricants are generally added in a proportion of 1 to 5 parts by weight to 100 parts by weight of binder.

[Binder]

The binders used in the magnetic layer, the nonmagnetic layer and the backing coat layer of the present magnetic recording medium may be any of resins hitherto used as binders, including known thermoplastic resins, thermosetting resins, reactive resins and mixtures thereof. Thermoplastic resins usable herein are those having their glass transition temperatures in the range of −100 to 150° C., their number average molecular weights in the range of 1,000 to 200,000, preferably 10,000 to 100,000, and polymerization degrees of the order of 50–1,000.

Examples of such thermoplastic resins include homopolymers and copolymers containing constituent units derived from monomers, such as vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal and vinyl ether; polyurethane resin; and various resins of rubber type. And examples of thermosetting resins or reactive resins include phenol resin, epoxy resin, polyurethane resin of cure type, urea resin, melamine resin, alkyd resin, acrylic reactive resin, formaldehyde resin, silicone resin, epoxy-polyamide resin, a mixture of polyester resin and isocyanate prepolymer, a mixture of polyesterpolyol and polyisocyanate, and a mixture of polyurethane and polyisocyanate. Details of these resins are described, e.g., in *Plastics Handbook*, published by Asakura Shoten. In addition, it is possible to use known electron beam-curable resins in each layer. Detailed explanation of such resins and manufacturing methods thereof can be found in JP-A-62-256219. The resins as recited above can be used alone or as a combination of two or more thereof. Examples of a resin combination include a combination of polyurethane resin and at least one resin selected from the groups consisting of vinyl chloride resin, vinyl chloride-vinyl acetate copolymer, vinyl chloride-vinyl acetate-vinyl alcohol terpolymer and vinyl chloride-vinyl acetate-maleic anhydride terpolymer, and a combination of the foregoing combination and polyisocyanate.

As the makeup of the polyurethane resin, known ones including polyesterpolyurethane, polyetherpolyurethane, polyetherpolyesterpolyurethane, polycarbonatepolyurethane, polyesterpolycarbonatepolyurethane and polycaprolactone-polyurethane can be adopted. For enhancing dispersibility and durability of all the binders recited above, it is appropriate that at least one polar group selected from —COOM, —$SO_3M$, —$OSO_3M$, —P=$O(OM)_2$, —O—P=$O(OM)_2$ (wherein M is a hydrogen atom or an alkali metal), —OH, —$NR_2$, —$N^+R_3$ (wherein R is a hydrocarbon group), epoxy group, —SH or —CN be introduced into each binder by copolymerization or addition reaction on an as needed basis.

The suitable content of such polar groups in each binder is from $10^{-1}$ to $10^{-8}$ mole/g, preferably from $10^{-2}$ to $10^{-6}$ mole/g.

Examples of those binders usable in the invention include VAGH, VYHH, VMCH, VAGF, VAGD, VROH, VYES, VYNC, VMCC, XYHL, XYSG, PKHH, PKHJ, PKHC and PKFE, produced by Union Carbide Co.; MPR-TA, MPR-TA5, MPR-TAL, MPR-TSN, MPR-TMF, MPR-TS, MPR-TM and MPR-TAO, produced by Nissin Chemical Industry Co., Ltd.; 1000W, DX80, DX81, DX82, DX83 and 100FD, produced by Electro Chemical Industry Co., Ltd.; MR-104, MR-105, MR110, MR100, MR555 and 400X-110A, produced by ZEON CORP.; Nipporan N2301, N2302 and N2304, produced by Nippon Polyurethane Industry Co., Ltd.; Pandex T-5105, T-R3080 and T-5201, Barnoc D-400 and D-210-80, and Crysbon 6109 and 7209, produced by Dainippon Ink & Chemicals, Inc.; Vylon UR8200, UR8300, UR-8700, RV530 and RV280, produced by Toyobo Co.; Daiferamine 4020, 5020, 5100, 5300, 9020, 9022 and 7020 produced by Dainichiseika C. & C. Mfg.; MX5004 produced by Mitsubishi Chemical Industries Ltd.; Sanprene SP-150 produced by Sanyo Chemical Industries Co., Ltd.; and Saran F310 and F210, produced by Asahi Chemical Industry Co., Ltd.

Such binders are used in a proportion ranging generally from 5 to 50 weight %, preferably from 10 to 30 weight %, to non-magnetic powder in the nonmagnetic layer or ferromagnetic powder in the magnetic layer. When vinyl chloride resin is used as binder, the suitable proportion thereof is in the range of 5 to 30 weight %, when polyurethane resin is used as binder, the suitable proportion thereof is in the range of 2 to 20 weight %, and when polyisocyanate is used, the suitable proportion thereof is in the range of 2 to 20 weight %. And the combined use of these resins is advantageous. However, it is possible to use polyurethane alone or a combination of polyurethane with polyisocyanate alone in the case where a slight amount of chlorine evolved by dechlorination causes head corrosion. When polyurethane is used in the invention, it is advantageous that the polyurethane has a glass transition temperature in a range of −50 to 150° C., preferably 0 to 100° C., endures an elongation of 100 to 2,000% and a stress of 0.49 to 98 MPa (0.05 to 10 kg/mm$^2$) before it breaks and has a yield point of 0.49 to 98 MPa (0.05 to 10 Kg/mm$^2$).

When the present magnetic recording medium has two or more constituent layers including a lower layer and an upper layer, it goes without saying that the binder content, the proportions of vinyl chloride resin, polyurethane resin, polyisocyanate and other resins in the total binder, or the molecular weights of resins forming magnetic layer(s) and the polar group contents in the resins, or the physical characteristics of the resins recited above may vary among the nonmagnetic layer and the magnetic layer(s), if needed. If anything, it is better to optimize those factors on a constituent layer basis. In this case, known arts of multiple magnetic layers are applicable. When the binder content varies from one constituent layer to another, for instance, an increase of a binder content in the magnetic layer is effective in reducing abrasion at the magnetic layer surface, while an increase of a binder content in the nonmagnetic layer can offer more flexibility and improve the touch of a head on the magnetic recording medium.

Examples of polyisocyanate usable in the invention include isocyanates, such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; reaction products of these isocyanates and polyalcohols; and polyisocyanates as condensation products of isocyanates. Commercially available products of the isocyanates as recited above are, e.g., Colonate L, Colonate HL, Colonate 2030, Colonate 2031, Millionate MR and Millionate MTL (trade names, produced by Nippon Polyurethane Industry Co., Ltd.), Takenate D-102, Takenate D-110N, Takenate D-200 and Takenate D-202 (trade names, produced by Takeda Chemical Industries, Ltd.), and Desmodur L, Desmodur IL, Desmodur N and Desmodur HL (trade names, produced by Sumitomo Bayer Co., Ltd.). In each layer, these products may be used alone or in a state that two or more thereof are combined utilizing a difference in curing reactivity.

It is preferable that the present magnetic recording medium contains other additives in each of the magnetic layer(s), the non-magnetic layer and the backing coat layer.

The additives usable in the invention are compounds having a lubricating effect, an anti-static effect, a dispersing effect or a plasticizing effect. Examples of such compounds usable as additives include molybdenum disulfide, tungsten disulfide, graphite, boron nitride, fluorinated graphite, silicone oil, polar group-containing silicone, fatty acid-modified silicone, fluorine-containing silicone, fluorine-containing alcohol, fluorine-containing ester, polyolefin, polyglycol, alkyl phosphoric acid ester and alkali metal salts thereof, alkylsulfuric acid ester and alkali metal salts thereof, polyphenyl ether, fluorine-containing alkylsulfuric acid ester and alkali metal salts thereof, monobasic fatty acid containing 10 to 24 carbon atoms (which may contain unsaturated bonds or branched chains) and metal salts of such a fatty acid (e.g., Li, Na, K and Cu salts), monohydric to hexahydric alcohol containing 12 to 22 carbon atoms (which may have unsaturated bonds or branched chains), alkoxyalcohol containing 12 to 22 carbon atoms, mono-, di- or trifatty acid ester produced by reaction of 10–24C monobasic fatty acid (which may have unsaturated bonds or branched chains) with one kind of alcohol chosen from 2–12C monohydric to hexahydric alcohol (which may have unsaturated bonds or branched chains), fatty acid ester of polyalkylene oxide monoalkyl ether, fatty acid amide containing 8 to 22 carbon atoms, and aliphatic amine containing 8 to 22 carbon atoms.

More specifically, the foregoing additives includes lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol. Further, nonionic surfactants of alkylene oxide type, glycerin type, glycidol type and alkylphenol-ethylene oxide adduct type, cationic surfactants, such as cyclic amines, ester amides, quaternary ammonium salts, hydantoin derivatives, heterocyclic compounds, phosphoniums and sulfoniums, anionic surfactants containing acid groups such as carboxyl, sulfo, phospho, sulfate and phosphate groups, and amphoteric surfactants, such as amino acids, aminosulfonic acids, sulfuric or phosphoric acid esters of aminoalcohols and alkyl betaine-type surfactants, can be used.

Details of these surfactants are described in *Kaimen Kasseizai Binran* (*which may be translated by the English title "Handbook of Surfactants"*), published by Sangyo Tosho K.K. The lubricants and anti-static agents as recited above are not always required to be 100% pure, but may contain impurities, such as isomers, materials remaining unreacted, by-products, decomposed matter and oxides. The allowable level of contamination with such impurities is below 30%, preferably below 10%.

The types and amounts of those lubricants and surfactants can be, changed so as to suit the characteristics required of the underlayer, the magnetic layer and the backing coat layer, respectively. For instance, it is thought that oozing from the surface is controlled by using fatty acids having different melting points in the underlayer, the magnetic layer and the backing coat layer, respectively, or by using esters differing in boiling point or polarity in the underlayer, the magnetic layer and the backing coat layer, respectively, the coating stability is enhanced by controlling the amount of surfactants added, and the lubricating effect is elevated by adding a greater amount of lubricant to the nonmagnetic layer. Needless to say, the cases mentioned above should not be construed as limiting the scope of the invention. All or part of additives used in the invention may be added in any of processes for preparing a magnetic coating composition. For instance, there may be cases where the additives are mixed with a ferromagnetic powder prior to the kneading process, they are added during the process of kneading a ferromagnetic powder, a binder and a solvent, they are added in the process of dispersion, they are added after the dispersion process, and they are added just before coating. On the other hand, simultaneous or successive application of all or part of the additives to an already formed magnetic layer sometimes allows the desired purposes to be achieved. Depending on the purposes, on the other hand, the magnetic layer surface may be coated with a lubricant after calendering or slitting operation.

Examples of commercially produced lubricants usable in the invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, caster oil-hydrogenated fatty acid, NAA-42, NAA-44, Cation SA, Cation MA, Cation AB, Cation BB, Nimean L-201, Nimean L-202, Nimean S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogly MR, Nonion DS-60, Anon BF, Anon LG, butyl stearate, butyl laurate and erucic acid, which are products of Nippon Oil & Fats Co., Ltd.; oleic acid, a product of Kanto Kagaku K.K.; FAL-205 and FAL-123, products of Takemoto Yushi K.K.; ENUJELB LO, ENUJELB IPM and SANSO-CIZER E4030, products of New Japan Chemical; TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910 and KF-3935, products of Shin-Etsu Chemical Co., Ltd.; Armide P, Armide C and Armoslip CP, products of Lion Armargh Co.; Duomine TDO, a product of Lion Corp.; BA-41G, a product of Nisshin Oil Mills; and Prophan 2012E, Newpole PE61, Ionet MS-400, Ionet MO-200, Ionet DL-200, Ionet DS-300, Ionet DS-1000 and Ionet DO-200, products of Sanyo Kasei.

Known techniques for magnetic layers can be applied to binders, lubricants, dispersing agents, additives, solvents and dispersing methods used in the present magnetic layer, nonmagnetic layer and backing coat layer.

[Nonmagnetic Support]

In the present magnetic recording medium, a flexible material having a thickness of 3.0 to 10 μm, preferably 3.0 to 8.0 μm, far preferably 3.0 to 7.0 μm, can be used as a nonmagnetic support.

Examples of a non-magnetic flexible support usable in the invention include known films, such as films of polyesters (e.g., polyethylene terephthalate, polyethylene naphthalate), polyolefins, cellulose triacetate, polycarbonate, polyamide, polyimide, polyamideimide, polysulfone and aromatic polyamide. These support materials may undergo in advance corona discharge, plasma treatment, adhesion-increasing treatment, heat treatment and dust removal treatment.

For achieving the present purposes, the surface roughness dimensions is adjusted freely by selecting sizes and amounts of fillers added to the nonmagnetic support on an as needed basis. Examples of such fillers include inorganic fine powders of oxides or carbonates of Ca, Si and Ti, and organic fine powders of acrylic resins. It is appropriate that the support have a maximum height SRmax of 1 μm or below, a ten-point average roughness SRz of 0.5 μm or below, a center-plane peak height SRp of 0.5 μm or below, a center-plane valley depth SRv of 0.5 μm or below, a center-plane area rate SSr of 10% to 90% and an average wavelength Sλa of 5 μm to 300 μm. In order to achieve the desired electromagnetic conversion characteristic and durability, it is required to form minute projections on the support surface, and the formation of minute projections can be generally controlled by adding and dispersing 0 to 20,000 pieces/mm$^2$ of filler particles measuring in average size from 0.01 to 0.2 μm into a binder to form the support. In this case, coarse particles originated from particle size distribution and those formed by aggregation are generally present, so coarse projections of coarse-particle origin are present. In the invention, it is preferable that the number of projections 0.273 μm or above in height is 100 or below, preferably 80 or below, far preferably 50 or below, per 100 cm$^2$.

The suitable F-5 value of the nonmagnetic support used in the invention is from 49 to 490 MPa (5 to 50 Kg/mm$^2$). The suitable thermal shrinkage ratio of the nonmagnetic support is at most 3%, preferably at most 1.5%, under heating at 100° C. for 30 minutes, and at most 1%, preferably at most 0.5%, under heating at 80° C. for 30 minutes. It is advantageous for the support to have its tensile strength at break in the range of 49 to 980 MPa (5 to 100 kg/mm$^2$) and its elasticity modulus of 980 to 19600 Mpa (100 to 2000 Kg/mm$^2$) and its temperature expansion coefficient in the range of $10^{-4}$ to $10^{-8}/°$ C., preferably $10^{-5}$ to $10^{-6}/°$ C. And the humidity expansion coefficient of the support is $10^{-4}$/RH % or below, preferably $10^{-5}$/RH % or below. And it is preferable that those thermal characteristics, dimensional characteristics and mechanical strength characteristics are roughly equal within 10% variations in every direction of the support plane.

[Layer Structure]

Between the nonmagnetic flexible support and the underlayer or the magnetic layer, a subbing layer may be provided for the purpose of adhesion enhancement. The suitable thickness of the subbing layer is from 0.01 to 0.5 μm, preferably from 0.02 to 0.5 μm. The present magnetic recording material may be a double-sided magnetic disk medium which has underlayers and magnetic layers on both sides of the support, or there's nothing wrong with providing an underlayer and a magnetic layer on only one side of the support. In this case, a backing coat layer may be provided on the side opposite to the side of the magnetic layer and the nonmagnetic layer for producing antistatic and curl compensation effects. The thickness thereof is from 0.2 to 1.5 μm, preferably from 0.3 to 0.8 μm. To such subbing and backing coat layers, known ones are applicable.

In the present magnetic recording medium, the suitable average thickness of the magnetic layer is from 40 to 150 nm, preferably from 50 to 120 nm. The present purposes can be attained irrespective of whether the magnetic layer is a single layer or multiple layers.

The thickness of a nonmagnetic layer as the underlayer of the present magnetic recording medium is generally from 0.2 μm to 5.0 μm, preferably from 0.3 μm to 3.0 μm, particularly preferably from 1.0 μm to 2.5 μm.

[Preparation Method of Magnetic Recording Medium]

The present magnetic recording medium can be prepared by coating and drying coating compositions for forming constituent layers (hereinafter referred simply to as coatings, too), respectively. The process of preparing a coating includes at least a kneading step, a dispersing step, and mixing steps provided before or after those steps if needed. Each step may be separated into at least two stages. Each of ingredients, such as a ferromagnetic powder, a binder, carbon black, an abrasive, an antistatic agent, a lubricant and a solvent, may be added at the beginning or in the course of every step. In addition, each ingredient may be divided into two or more portions, and added in separate steps. For instance, the input of polyurethane resin may be divided among a kneading step, a dispersing step and a mixing step for viscosity adjustment after dispersion.

Examples of an organic solvent usable in the preparation process of the present magnetic recording medium include ketones, such as acetone, methyl ethyl ketone, methyl isobutyl ketone, diisobutyl ketone, cyclohexanone, isophorone and tetrahydrofuran; alcohol substances, such as methanol, ethanol, propanol, butanol, isobutyl alcohol, isopropyl alcohol and methylcyclohexanol; esters, such as methyl acetate, butyl acetate, isobutyl acetate, isopropyl acetate, ethyl lactate and glycol acetate; glycol ethers, such as glycol dimethyl ether, glycol monoethyl ether and dioxane; aromatic hydrocarbons, such as benzene, toluene, xylene, cresol and chlorobenzene; chlorinated hydrocarbons, such as methylene chloride, ethylene chloride, carbon tetrachloride, chloroform, ethylene chlorohydrin and dichlorobenzene; N,N- dimethylformamide; and hexane. These solvents can be used in arbitrary proportions. And they are not always required to be 100% pure, but may contain impurities, such as isomers, unreacted materials, by-products, decomposed matter, oxides and moisture. The allowable level of contamination with such impurities is below 30%, preferably below 10%. It is appropriate that the solvents used in the present magnetic and nonmagnetic layers be similar in kind, but they may be different in amount added. Therein, it is required that the coating stability be enhanced by using solvents having high surface tension (e.g., cyclohexanone, dioxane) in the nonmagnetic layer, specifically the arithmetic mean for the upper layer solvent composition is not below the arithmetic mean for the lower layer solvent composition. For promoting the dispersibility, it is appropriate that the polarity of solvents used be high to a certain extent. Therefore, the suitable proportion of solvents having permittivity of at least 15 in the solvent composition is at least 50%. Further, it is advantageous that the dissolution parameter is from 8 to 11.

Although it goes without saying that hitherto known preparation techniques may be applied to some steps for preparing the present magnetic recording medium, the use of a mighty kneading machine, such as a continuous kneader or a pressurized kneader, at the kneading step enables the magnetic recording medium to have a high residual magnetic flux density Br. When such a kneader is used, all or part of binder (preferably at least 30% of the total binder) and ferromagnetic powder are kneaded in proportions of 15–500 parts by weight binder to 100 parts by weight ferromagnetic powder. The details of those kneading treatments are described in JP-A-1-106338 and JP-A-64-79274. On the other hand, in the case of preparing a coating composition for forming the nonmagnetic layer as underlayer, it is preferable to use a dispersion medium greater in specific gravity, and zirconia beads are suitable as such a dispersion medium.

In the invention, it is possible to adopt a method which includes coating a coating composition for forming a nonmagnetic layer containing a nonmagnetic powder and a binder and a coating composition for forming a magnetic layer containing a ferromagnetic powder and a binder on a nonmagnetic flexible support simultaneously or sequentially so that the magnetic layer is formed on the nonmagnetic layer, and subjecting the thus coated layers to smoothing treatment and magnetic alignment while they are in a wet state.

For preparing the magnetic recording medium having a multilayer structure as mentioned above, the following coating methods and devices can be adopted:

(1) A lower layer is formed first by the use of a coating device usually used for coating magnetic coating compositions, such as a gravure, roll, blade or extrusion coating device. And while it is in a wet state, the lower layer is coated with an upper layer by the use of a pressurized support-type extrusion coating device as disclosed in JP-B-1-46186, JP-A-60-238179 and JP-A-2-265672.

(2) An upper layer and a lower layer are coated almost simultaneously by the use of a coating head having 2 slits for passage of coating compositions as disclosed in JP-A-63-88080, JP-A-2-17971 and JP-A-2-265672.

(3) An upper layer and a lower layer are coated almost simultaneously by the use of a backup roll-attached extrusion coating device as disclosed in JP-A-2-174965.

In addition, it is preferable to apply sheering stress to the coating composition in the interior of a coating head by the use of the method disclosed in JP-A-62-95174 or JP-A-1-236968 in order that the magnetic recording medium to be formed can avoid suffering degradation in electromagnetic conversion characteristics from agglomeration of magnetic particles. Further, it is appropriate for the coating composition to have their viscosity in the numerical range disclosed in JP-A-3-8471.

The smoothing treatment can be effected, e.g., by applying a stainless plate to the surface of a coating layer on a web. In addition to such a method, other smoothing methods including the method using the solid smoother disclosed in JP-B-60-57387, the method of scraping away the coating composition by means of a rod at rest or rotating in the direction opposite to the coating direction while measuring the composition scraped and the method of bringing a flexible sheet into face-to-face contact with the surface of liquid coating film can be adopted for smoothing treatment.

For effecting the magnetic alignment treatment, it is appropriate to apply a magnetic field generated from a combination of solenoid of at least 0.1 T (1,000 G) and a cobalt magnet of at least 0.2 T (2,000 G) placed so that the same poles thereof face each other. In the case of applying the invention to disk media, on the other hand, it is rather required to adopt a method for randomizing magnetic orientations.

Furthermore, a heat-resistant plastic roll, such as a roll made from epoxy resin, polyimide, polyamide or polyimideamide, can be used in calendering treatment. A pair of metal rolls can also be used for the treatment. The suitable treatment temperature is 70° C. or higher, preferably 80° C. or higher, and the suitable linear pressure applied is at least 200 kg/cm, preferably at least 300 kg/cm. The suitable coefficients of friction of the magnetic layer surface and the opposite surface of the present magnetic recording medium against SUS 420J is 0.5 or below, preferably 0.3 or below, and the suitable surface resistibility is from $10^4$ to $10^{12}$ Ω/sq. The suitable elasticity modulus of the magnetic layer under 0.5% elongation is from 100 to 2,000 kg/mm$^2$ in each of running and width directions, and the appropriate strength at break is from 1 to 30 kg/cm$^2$. The suitable elasticity modulus of the magnetic recording medium in each of running and cross directions is from 100 to 1,500 kg/mm$^2$, the appropriate residual elongation is at most 0.5%, and the appropriate thermal shrinkage ratio at all temperatures not higher than 100° C. is at most 1%, preferably at most 0.5%, particularly preferably at most 0.1%. The suitable glass transition temperature of the magnetic layer (the maximum point of loss elasticity modulus in the kinetic viscoelasticity measurement made at 110 Hz) is from 50° C. to 120° C., and that of the underlayer is from 0° C. to 100° C. The appropriate loss elasticity modulus is from $1\times10^8$ to $8\times10^9$ dyne/cm$^2$, and the appropriate loss tangent is 0.2 or below. When the loss tangent is too great, a tackiness trouble tends to occur.

The appropriate content of residual solvent in the magnetic layer is 100 mg/m$^2$ or below, preferably 10 mg/m$^2$ or below. The appropriate porosity of non-magnetic underlayer and that of magnetic layer are both 30 volume % or below, preferably 20 volume % or below. The smaller porosity is more favorable for achieving high output, but the porosity may be increased up to a certain value depending on the desired purpose. In many of repetition use-oriented magnetic media for data recording, for instance, the greater porosity is more favorable for ensuring running durability. As to the magnetic characteristics of the present magnetic recording medium, the squareness ratio in the tape-running direction is at least 0.7, preferably at least 0.8, far preferably at least 0.9, as measured in a magnetic field of 398 kA/m (5 KOe), and the suitable squareness ratios in two directions vertical to the tape-running direction are both 80% or less of the squareness ratio in the tape-running direction. The suitable SFD (Switching Field Distribution) of the magnetic layer is 0.6 or below.

The present magnetic recording medium has an upper layer (a magnetic layer), and a lower layer if needed, and it is easily guessed that the lower layer and the magnetic layer may differ in the physical characteristics as recited above depending on the intended purpose. For instance, the running durability is enhanced by elevating a elasticity modulus of the magnetic layer, and at the same time the elasticity modulus of the lower layer is rendered lower than that of the magnetic layer to better a head touch on the magnetic recording medium. In determining physical properties imparted to two or more of magnetic layers respectively, known techniques for superimposing magnetic layers can be referred to. For instance, in many inventions including JP-A-37-2218 and JP-A-58-56228, the Hc of an upper magnetic layer is adjusted to be higher than that of a lower magnetic layer. By reducing the magnetic layer thickness as in the invention, recording is possible even on the magnetic layer having higher HC.

EXAMPLES

Although the invention will now be illustrated in more detail by reference to the following examples, it goes without saying that these examples should not be construed as limiting the scope of the invention. Additionally, in the following examples and comparative examples, all parts are by weight unless otherwise indicated.

The kinds of ferromagnetic metal powders used in the following examples and comparative examples are shown in Table 1.

TABLE 1

|  | A | B | C |
|---|---|---|---|
| Co/Fe (atomic %) | 24 | 23 | 24 |
| Al/Fe (atomic %) | 11 | 11 | 11 |
| Y/Fe (atomic %) | 9 | 9 | 10 |
| Hc (kA/m) | 183 | 175 | 183 |
| σs (A·m²/kg) | 82 | 87 | 123 |
| $S_{BET}$ (m²/g) | 60 | 66 | 70 |
| Major-axis length (nm) | 70 | 70 | 80 |
| Crystallite size (Å) | 110 | 110 | 110 |
| PH | 9 | 9 | 9 |

Examples 1 to 3, and Comparative Examples 1 to 3

| (Coating Composition for Magnetic Layer) | |
|---|---|
| Ferromagnetic metal powder (See Table 1) | 100 parts |
| Vinyl chloride copolymer | 5 parts |
| (MR-100, a product of ZEON CORP.) | |
| Polyesterpolyurethane resin | 3 parts |
| (molecular weight: $3.5 \times 10^4$ | |
| neopentylglycol/caprolactonepolyol/MDI = 0.9/2.6/1 | |
| content of - $SO_3Na$ groups: $1 \times 10^{-4}$ eq/g) | |
| Carbon black | 0.5 parts |
| (average particle size: 80 nm) | |
| α-$Al_2O_3$ | 5 parts |
| (average grain size: 0.1 µm) | |
| $SiO_2$ (See Table 2) | |
| Phenylphosphonic acid | 3 parts |
| Stearic acid (for industrial use) | 0.5 parts |

-continued

| (Coating Composition for Magnetic Layer) | |
|---|---|
| sec-Butyl stearate (for industrial use) | 1.5 parts |
| Cyclohexanone | 30 parts |
| Methyl ethyl ketone | 90 parts |
| Toluene | 60 parts |

The amount and the grain size of the $SiO_2$ used in each of Examples and Comparative Examples are shown in

TABLE 2

| (Coating Composition for Nonmagnetic Layer) Coating for Underlayer | |
|---|---|
| α- $Fe_2O_3$ | 80 parts |
| (Average major-axis length: 0.1 µm, $S_{BET}$: 48 m²/g, pH: 8, $Al_2O_3$ is present on the surface in the proportion of 1% by weight to the total grain) | |
| Carbon black | 20 parts |
| (average primary particle size: 16 nm) | |
| Vinyl chloride copolymer | 10 parts |
| (MR-110, a product of ZEON CORP.) | |
| Polyesterpolyurethane resin | 5 parts |
| (molecular weight: $3.5 \times 10^4$ | |
| neopentylglycol/caprolactonepolyol/MDI = 0.9/2.6/1 | |
| content of - $SO_3Na$ groups: $1 \times 10^{-4}$ eq/g) | |
| Stearic acid | 1 parts |
| sec-Butyl stearate (for industrial use) | 1 parts |
| Cyclohexanone | 50 parts |
| Methyl ethyl ketone | 100 parts |
| Toluene | 50 parts |

In preparing each of coating compositions for a magnetic layer (an upper layer) and a nonmagnetic layer (a lower layer), the pigments, the polyvinyl chloride, the phenylphosphonic acid, and the solvents in 50% of their amounts prescribed respectively were kneaded with a kneader, and then admixed with the polyurethane resin and the residual ingredients. The admixture obtained was dispersed with a sand mill. To the dispersion thus obtained, the polyisocyanate (Colonate L, a product of Nippon Polyurethane Industry Co., Ltd.) was added in an amount of 1 parts in the case where the dispersion was prepared for the magnetic layer, and it was added in an amount of 3 parts in the case where the dispersion was prepared for the lower layer. Furthermore, a mixed solvent constituted of methyl ethyl ketone and cyclohexanone was added in an appropriate amount to each of the coating compositions. The resulting compositions were each passed through a filter having an average pore size of 1 µm, thereby preparing a coating composition A for forming the upper layer and a coating composition B for forming the lower layer, respectively.

The lower layer coating composition thus prepared was coated on a 6 µm-thick polyethylene naphthalate (PEN) support so that the lower layer coated had a dry thickness of 1.5 µm, and dried. Thereon, the upper layer composition was coated so that the upper layer coated had a dry thickness of 90 nm. And the upper layer underwent orienting treatment while the upper layer was in a wet state.

After drying both upper and lower coating layers, the support was coated with the following composition for a backing coat layer on the side opposite to the side of the upper and lower layers so that the backing coat layer had a dry thickness of 0.5 µm. After drying, the support provided with the coatings was treated with a 7-stage calender under a temperature of 90° C. and a speed of 200 m/min, thereby effecting smoothing treatment.

| (Coating Composition for Backing Coat Layer) | |
| --- | --- |
| Fine-particle carbon black (average particle size: 17 nm, BP-800 produced by Cabot Corporation) | 100 parts |
| Coarse-particle carbon black (average particle size: 270 nm, thermal black produced by Cancarb Limited) | 10 parts |
| α- Fe$_2$O$_3$ (average grain size: 0.11 µm, TF100 produced by Toda Kogyo Corp.) | 15 parts |
| Nitrocellulose resin | 140 parts |
| Polyurethane resin | 15 parts |
| Polyester resin | 5 parts |
| Polyisocyanate resin | 40 parts |
| Copper oleate | 5 parts |
| Copper phthalocyanine | 5 parts |

The thus prepared roll precursor of magnetic tape was heated at 70° C. for 48 hours, and thereby the polyisocyanate compound was cured.

Then, the thus cured roll precursor was slit into 6 mm-wide tapes while removing edges from both sides thereof.

<Evaluations>

The thus obtained samples were evaluated in accordance with the following methods, and thereby their effects were determined.

(1) Surface Roughness

The surface roughness Ra was determined using WYKO HD-2000 in accordance with the MIRAU method under conditions that the measuring wavelength was 770 nm, the measuring area was about 250 µm×about 180 µm and both tilt and cylinder corrections were made.

(2) C/N Measurement

The C/N ratio was measured with a drum tester. Recordings were made with an MIG head having Bs of 1.8 T and a gap length of 0.15 µm and played back with an MR head. Single-frequency signals of 21 MHz were recorded on each sample medium and the reproduction spectrum thereof was measured with a spectral analyzer made by ShibaSoku Co., Ltd. Therein, the velocities of the heads relative to the medium at the recording and playback times, respectively, were 10.5 m/sec. By this measurement, the C/N ratio (the ratio of the carrier output at 21 MHz to the noise at 19 MHz) was determined. The C/N ratios thus determined were shown as relative values, with the recording medium prepared in Example 1 being taken as 0 dB.

(3) Measurement of MR Head Abrasion

A DVCpro deck was mounted with an MR head, and the level difference between the substrate and the shield part after 100-hour running was measured with AFM.

(4) Measurement of Scratch Resistance

A ½ inch-wide abrasive tape was wrapped around a 4 mm-φ SUS rod at a 180° angle, and the one end thereof was fixed and a load of 100 g was imposed on the other end. A sample to be examined was wrapped at a 160° angle so that the magnetic layer surface thereof was brought into contact with the abrasive surface of the abrasive tape, and made to run at a speed of 30 mm/sec while imposing a load of 10 on one end of the sample. The number of abrasion marks thus made on the magnetic layer surface was counted under a microscope of 50× magnification, and its average value on the same level n=3 was determined.

The results obtained by these measurements are shown in Table 2.

TABLE 2

| | Magnetic powder (set forth in Table 1) | SiO$_2$ | | Surface roughness (nm) | C/N (dB) | Level difference by MR head abrasion (nm) | Scratch resistance (number of abrasion marks) |
| --- | --- | --- | --- | --- | --- | --- | --- |
| | | grain size (nm) | amount added (parts) | | | | |
| Example 1 | A | 12 | 5 | 2.2 | 0 | 28 | 1.5 |
| Example 2 | B | 7 | 5 | 2.1 | 0.2 | 35 | 2.0 |
| Example 3 | B | 12 | 5 | 2.2 | 0 | 30 | 1.4 |
| Comparative Example 1 | B | — | 0 | 2.0 | 0.4 | 100 | 21.3 |
| Comparative Example 2 | B | 50 | 5 | 2.4 | −1.0 | 20 | 1.1 |
| Comparative Example 3 | C | 12 | 5 | 2.2 | −1.9 | 32 | 1.5 |

As can be seen from Table 2, the recording tapes prepared in Examples 1 to 3 were high in C/N ratio, and reduced in level difference-inducing abrasion and in number of abrasion marks. On the other hand, no addition of SiO$_2$ grains to the magnetic layer as in the case of Comparative Example 1 caused a great level difference by abrasion in the MR head and deterioration in scratch resistance.

In Comparative Example 2, the grain size of SiO$_2$ added was great, so the C/N ratio was high though the level difference-inducing abrasion was small and scratch resistance was satisfactory.

In Comparative Example 3, the lowering of the C/N ratio was incurred through the use of the magnetic powder C.

In accordance with the invention, a magnetic recording medium having on a nonmagnetic support at least one magnetic layer containing a ferromagnetic metal powder and a binder and having a surface roughness of 3 nm or below is used, and the magnetic layer thereof contains as the ferromagnetic metal powder a ferromagnetic metal powder having an average major-axis length of 30 to 100 nm and saturation magnetization σs of 70 to 100 A·m$^2$/kg and further contains SiO$_2$ grains having an average size of 5 to 30 nm. In an MR head-equipped recording system, therefore, the present magnetic recording medium can show excellent electromagnetic conversion characteristics and can achieve reduction in MR head abrasion and enhancement of scratch resistance. In other words, the invention can provide a highly durable magnetic recording medium for high-density recording.

This application is based on Japanese Patent application JP 2003-002329, filed Jan. 8, 2003, the entire content of which is hereby incorporated by reference, the same as if set forth at length.

What is claimed is:

1. A magnetic recording medium comprising a nonmagnetic support, a non-magnetic underlayer, and a magnetic layer, in this order, the magnetic layer comprises a ferromagnetic metal powder and a binder and has an average surface roughness, Ra, of 0.5 to 3 nm, wherein the ferromagnetic metal powder has an average major-axis length of 30 to 100 nm and a saturation magnetization of 70 to 100 $A \cdot m^2/kg$, and the magnetic layer contains $SiO_2$ grains having an average size of 5 to 30 nm.

2. The magnetic recording medium according to claim 1, wherein the nonmagnetic support is a flexible material having a thickness of 3.0 to 10 μm.

3. The magnetic recording medium according to claim 1, wherein the magnetic layer has an average thickness of 40 nm to 150 nm.

4. The magnetic recording medium according to claim 1, wherein the $SiO_2$ grains have an average size of 5 to 25 nm.

5. The magnetic recording medium according to claim 1, wherein the magnetic layer further comprises carbon black and an abrasive.

6. The magnetic recording medium according to claim 1, wherein the non-magnetic underlayer comprises a nonmagnetic inorganic powder and a binder.

7. The magnetic recording medium according to claim 1, which further comprises a backing coat layer so that the backing coat layer, the nonmagnetic support, the non-magnetic underlayer, and the magnetic layer is in this order.

8. The magnetic recording medium according to claim 7, wherein the backing coat layer comprises a binder, carbon black, and an inorganic powder.

9. The magnetic recording medium according to claim 1, wherein the ferromagnetic powder has specific surface area of 40 to 80 $m^2/g$.

10. The magnetic recording medium according to claim 1, wherein the ferromagnetic powder has a crystallite size of 80 to 180 Å.

11. The magnetic recording medium according to claim 1, wherein the ferromagnetic powder has aspect ratio of 5 to 15.

12. The magnetic recording medium according to claim 1, wherein the ferromagnetic powder has a coercive force of 151 to 279 kA/m.

13. The magnetic recording medium according to claim 1, which is for use in a digital recording system equipped with an MR reproducing head.

14. A method comprising reproducing a magnetic recording medium by MR head, wherein the magnetic recording medium comprises a nonmagnetic support and a magnetic layer which contains a ferromagnetic metal powder and a binder and has an average surface roughness, Ra, of 0.5 to 3 nm, wherein the ferromagnetic metal powder has an average major-axis length of 30 to 100 nm and a saturation magnetization of 70 to 100 $A \cdot m^2/kg$, and the magnetic layer contains $SiO_2$ grains having an average size of 5 to 30 nm.

* * * * *